United States Patent [19]

Nibbe et al.

[11] Patent Number: 4,501,946
[45] Date of Patent: Feb. 26, 1985

[54] DEVICE FOR COOKING FOODS WITH MICROWAVES

[76] Inventors: Bodo B. Nibbe, Karlsplatz 6/IV, D-8000 Munich 2; Paul Hirsch, Karl-Theodor-Str. 91, D-8000 Munich 40, both of Fed. Rep. of Germany

[21] Appl. No.: 618,992

[22] Filed: Jun. 11, 1984

Related U.S. Application Data

[62] Division of Ser. No. 349,964, Feb. 18, 1982.

[30] Foreign Application Priority Data

Feb. 20, 1981 [DE]  Fed. Rep. of Germany ....... 3106236

[51] Int. Cl.³ .............................................. H05B 6/80
[52] U.S. Cl. ...................... 219/10.55 E; 219/10.55 F; 99/440; 99/DIG. 14
[58] Field of Search ................... 219/10.55 E, 10.55 F, 219/10.55 R; 99/440, 403, 410, 417, 451, DIG. 14; 426/243

[56] References Cited

U.S. PATENT DOCUMENTS

| | | | |
|---|---|---|---|
| 4,280,032 | 7/1981 | Levinson | 219/10.55 E |
| 4,317,017 | 2/1982 | Bowen | 219/10.55 E |
| 4,439,656 | 3/1984 | Peleg | 219/10.55 E |

FOREIGN PATENT DOCUMENTS

| | | | |
|---|---|---|---|
| 50-119048 | 9/1975 | Japan | 219/10.55 E |
| 622013 | 4/1949 | United Kingdom | 219/10.55 E |

*Primary Examiner*—P. H. Leung
*Attorney, Agent, or Firm*—Karl F. Ross; Herbert Dubno

[57] ABSTRACT

In order to boil eggs or other foods not suitable for cooking with direct microwave radiation, a receptacle containing such foods is separated from a microwave source by a radiation shield overlain by a heating vessel partly filled with water which is exposed to the microwaves. This vaporizes the water and the resulting steam is admitted through one or more tubes into the receptacle for a rapid heating of its contents. The shield may reflect the incident microwaves into the water bath.

8 Claims, 1 Drawing Figure

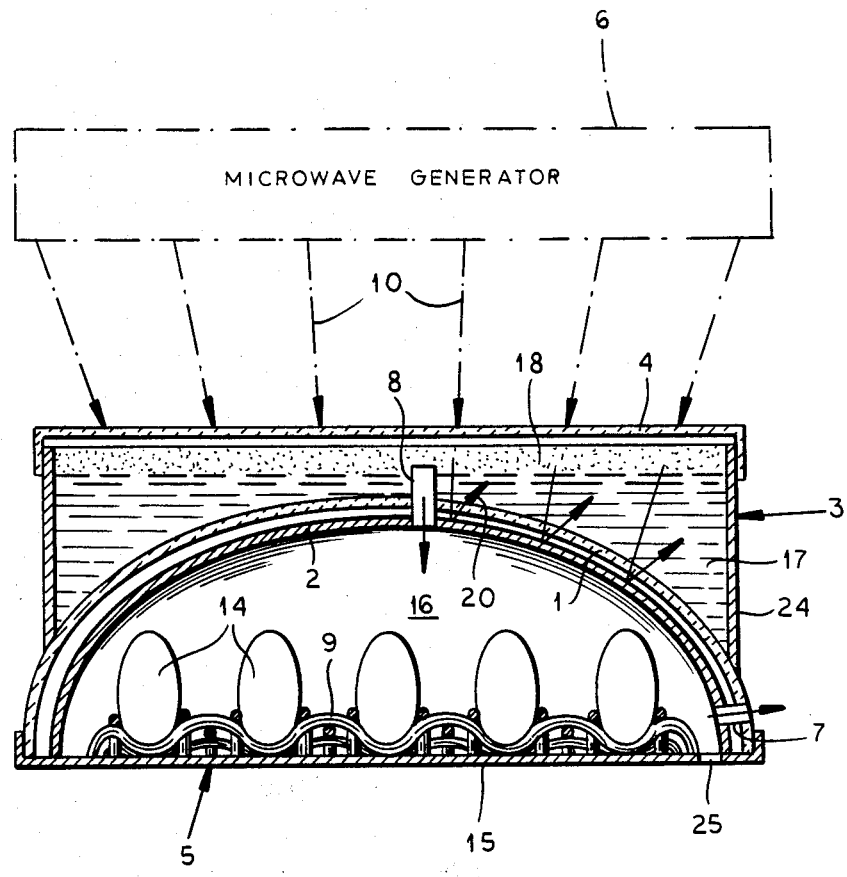

DEVICE FOR COOKING FOODS WITH MICROWAVES

This application if a division of application Ser. No. 349,964 filed Feb. 18, 1982.

FIELD OF THE INVENTION

Our present invention relates to a device for rapidly boiling foods with the aid of microwaves.

BACKGROUND OF THE INVENTION

Modern cooking stoves are not infrequently provided with microwave generators designed to expedite the preparation of meals. Certain foods, however, are not suitable for cooking with direct microwave radiation since the short treatment time does not allow them to expand or otherwise adjust themselves to the rising temperatures. Among foods of this type may be mentioned rice, legumes, pasta and eggs; the latter, in particular, tend to explode when irradiated with microwaves.

OBJECT OF THE INVENTION

The object of our present invention, therefore, is to provide a simple device utilizing an available microwave source for accelerating the boiling of foods in the category referred to.

SUMMARY OF THE INVENTION

In accordance with our present invention, we partly fill a vessel with water which is then vaporized by irradiation with microwaves. The resulting steam is directed into an adjoining area which contains the foods to be treated and which is shielded against the incident microwaves. For this purpose, a device designed for the treatment of a large amount of foodstuffs comprises a receptacle disposed beneath a vessel containing a microwave-irradiated body of water, this receptacle accommodating the foods to be treated and communicating via one or more conduits with a vapor space in the adjoining vessel for admitting steam evolving from the irradiated water; the contents of the receptacle are protected from the microwaves by a radiation shield which covers that receptacle, being interposed between the latter and the overlying steam-generating vessel.

According to a more particular feature of our invention, the radiation shield may be provided with a microwave-reflecting layer—such as a metal foil or grid—which may be coated upon or embedded in a shell of thermally insulating ceramic, vitreous or plastic material. Microwaves reflected by that shield may then be directed into the water compartment of the vaporizing vessel which for this purpose advantageously is interposed between the shield and the microwave source; with the walls of that vessel permeable to infrared radiation, the water contained therein will be heated by both incident and reflected microwaves.

BRIEF DESCRIPTION OF THE DRAWING

The above and other features of our invention will now be described in detail with reference to the accompanying drawing the sole FIGURE of which is a partly diagrammatic cross-sectional view of a device embodying our invention.

SPECIFIC DESCRIPTION

In the FIGURE we have schematically indicated a microwave generator 6 which may form part of a cooling stove not otherwise illustrated. A food receptacle 5 disposed in the path of emitted microwaves 10 has a bottom 15 overlain by a cover 2 which is designed as a radiation shield of poorly heat-conductive material provided with a radiation-reflecting layer, e.g. a coating of aluminum, preventing these microwaves from reaching an underlying steam chamber 16. The upwardly convex shield 2 is overlain with small spacing by a correspondingly shaped bottom 1 of a heating vessel 3 also having a peripheral wall 24 and a lid 4; at least the vessel bottom 1 and the lid 4 consist of radiation-permeable material such as glass, ceramic or plastic. The lower part of vessel 3 forms a water compartment 17 while its upper part constitutes a vapor space 18; the latter communicates via one or more tubes 8 with chamber 16 so that steam evolving in vessel 3 can enter the receptacle 5 to boil the foods contained therein, here shown as eggs 14 supported above bottom 15 by a metallic wire grid 9. Tube or tubes 8 must, of course, be long enough to protect above the highest water level in compartment 17. One or more exit ports 7 allow for the escape of excess steam from chamber 16 into the surrounding atmosphere; these ports may be connected to a nonillustrated suction line associated with the microwave generator 6. Bottom 15 has at least one drain opening 25 for the discharge of condensed water.

In operation, microwaves 10 pass through lid 4 into heating vessel 3 and thence through its bottom 1 to radiation shield 2 where they are reflected back into the vessel as indicated at 20. The water in compartment 17 is thereby rapidly vaporized so that steam from space 18 passes through tube or tubes 8 into chamber 16 and boils the eggs 14. We have found that, by this means, eggs will need only between 60 and 90 seconds to reach a state attained in 3 minutes of conventional boiling.

The food receptacle 5 and the heating vessel 3 may be of circular, polygonal or other horizontal outline.

We claim:

1. A device usable with a cooking stove equipped with a microwave source for rapidly boiling foods not suitable for cooking with direct microwave radiation, comprising:
    a vessel positioned for irradiation by microwaves from said source, said vessel forming a vapor space above an area reserved for a quantity of water to be vaporized by said microwaves;
    a receptacle underneath said vessel provided with conduit means communicating with said vapor space for admitting evolving steam to foods disposed in said receptacle; and
    a radiation shield interposed between said receptacle and said vessel for protecting the contents of said receptacle from said microwaves.

2. A device as defined in claim 1 wherein said radiation shield forms a removable cover for said receptacle.

3. A device as defined in claim 2 wherein said radiation shield is provided with a microwave-reflecting layer, said vessel having a microwave-permeable bottom closely overlying said radiation shield for penetration by the reflected microwaves.

4. A device as defined in claim 2 wherein said receptacle is provided with wire netting for supporting the foods to be boiled with all-around accessibility to the evolving steam.

5. A device as defined in claim 2 wherein said receptacle has an outlet enabling the escape of excess steam into the surrounding atmosphere.

6. A device as defined in claim 1 wherein said radiation shield is provided with a microwave-reflecting layer, said vessel having a microwave-permeable bottom closely overlying said radiation shield for penetration by the reflected microwaves.

7. A device as defined in claim 1 wherein said receptacle is provided with wire netting for supporting the foods to be boiled with all-around accessibility to the evolving steam.

8. A device as defined in claim 1 wherein said receptacle has an outlet enabling the escape of excess steam into the surrounding atmosphere.

* * * * *